Figure 3A:
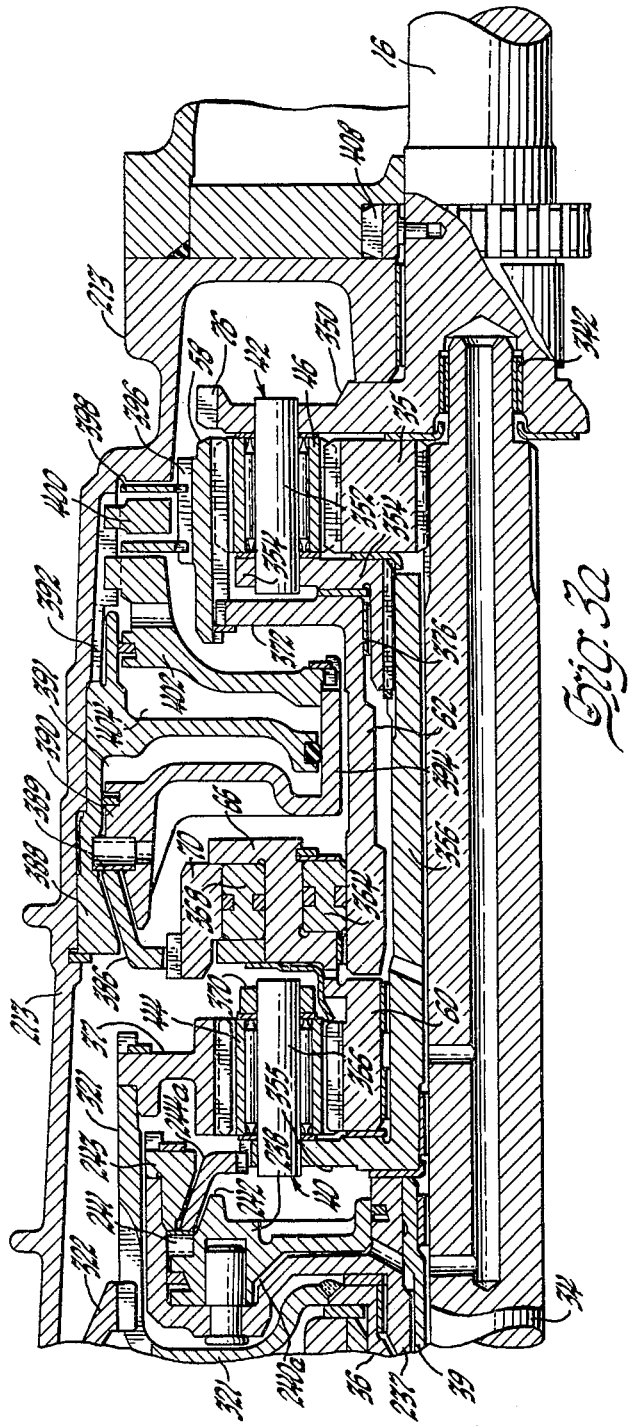

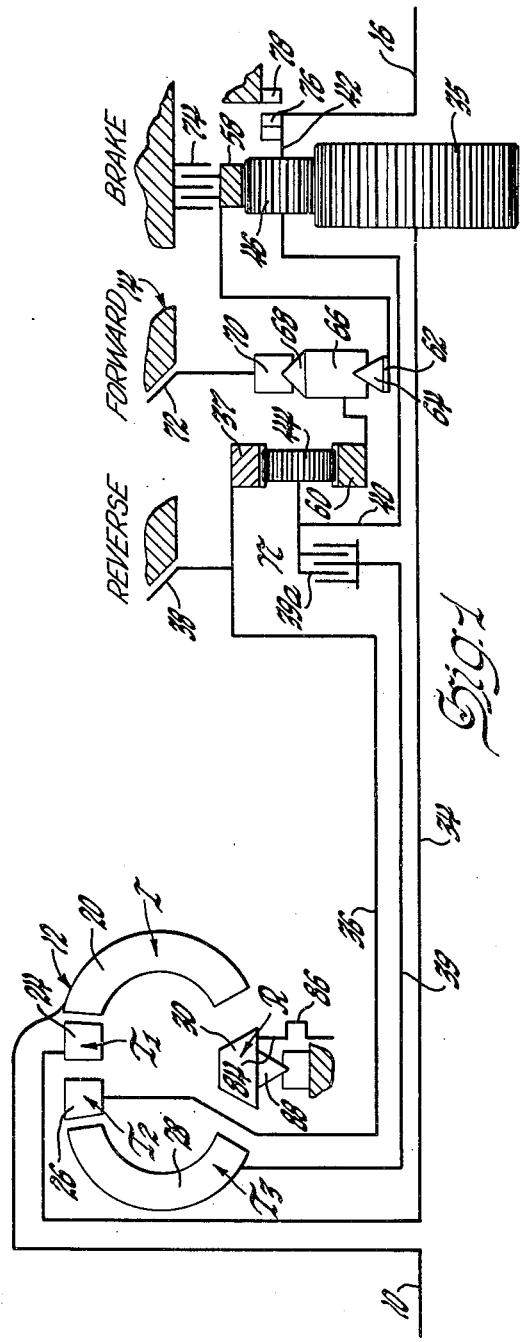

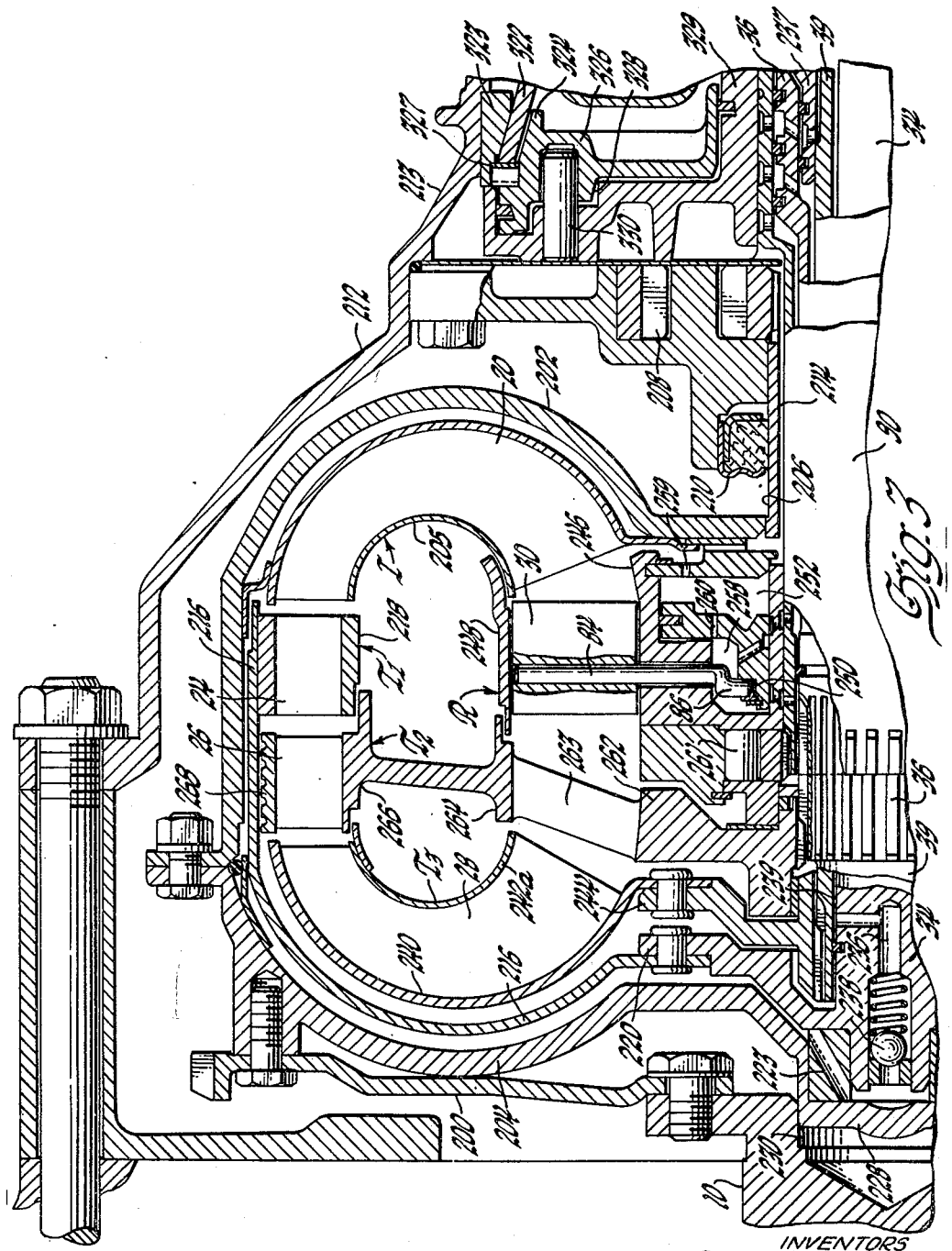

Nov. 14, 1961   F. J. WINCHELL ET AL   3,008,349
TRANSMISSION
Original Filed Dec. 22, 1955   6 Sheets-Sheet 4

INVENTORS
Frank J. Winchell &
BY   Oliver K. Kelley
T. R. Chisholm
ATTORNEY

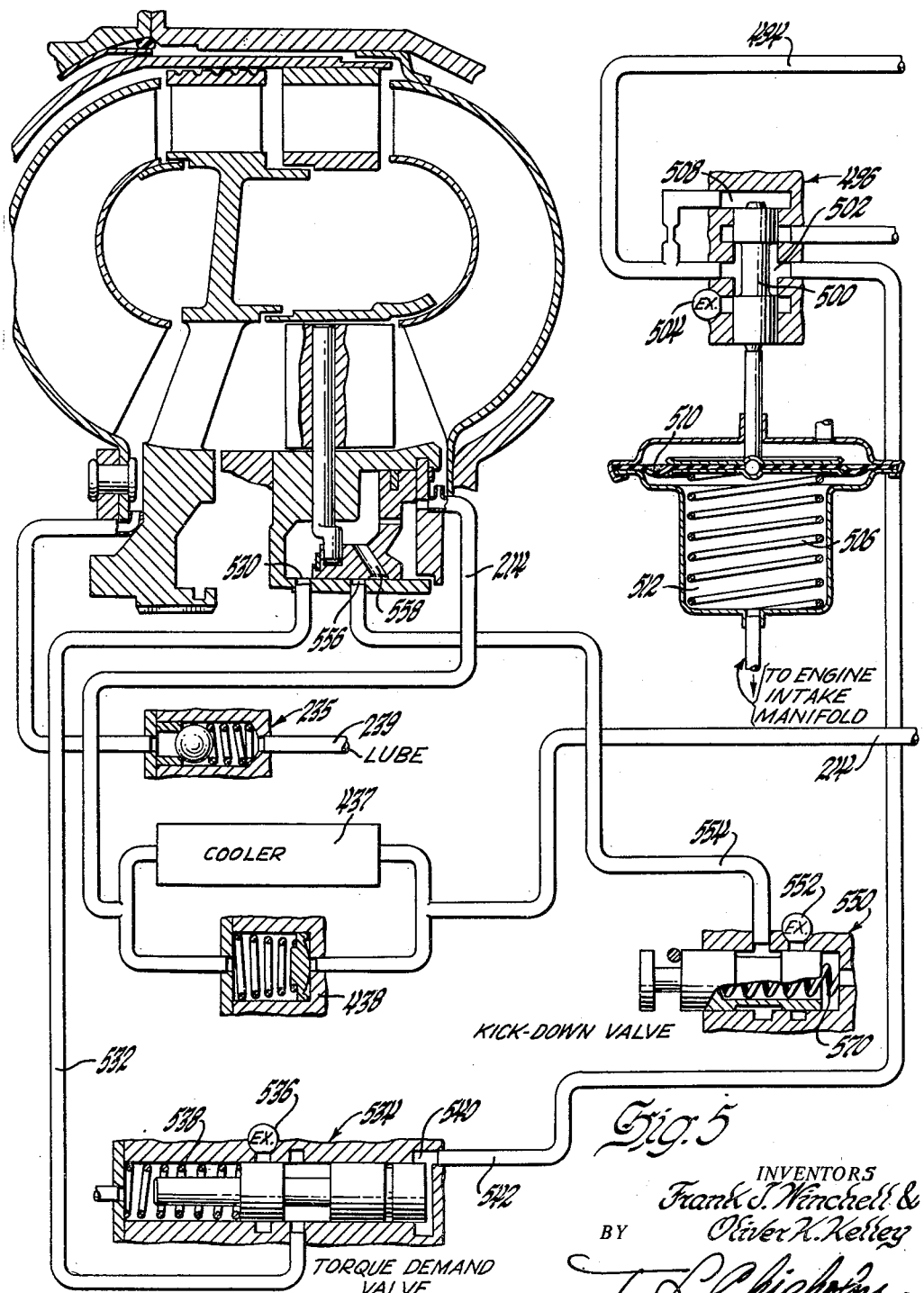

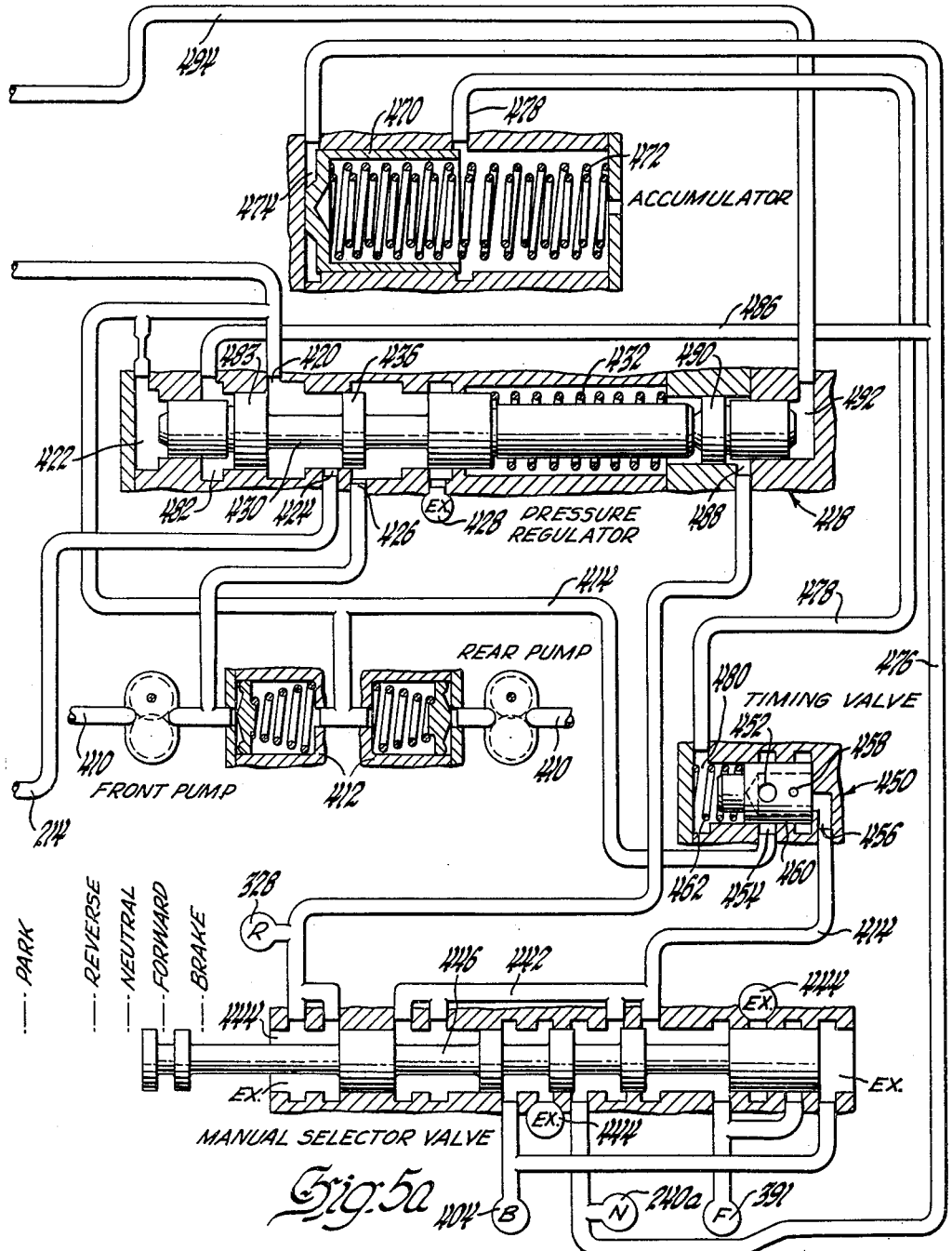

United States Patent Office 3,008,349
Patented Nov. 14, 1961

3,008,349
TRANSMISSION
Frank J. Winchell and Oliver K. Kelley, Bloomfield Hills, Mich., assignors to General Motors Corporation, Detroit, Mich., a corporation of Delaware
Original application Dec. 22, 1955, Ser. No. 554,881. Divided and this application Feb. 25, 1957, Ser. No. 642,278
11 Claims. (Cl. 74—688)

This is a division of our application, S.N. 554,881, filed December 22, 1955.

This invention relates to improvements in arrangements of hydrodynamic torque transfer and/or multiplying devices and associated gearing for driving a power output member at various speed ratios from a power input member. These are particularly, although not exclusively, suited to motor vehicle transmissions, and such a transmission is described herein as one example of a device to which our invention may be applied. Also, the invention is especially but not exclusively adapted to hydrodynamic torque converters or speed reducers which multiply torque.

In hydrodynamic torque converters a turbine can readily be constructed to provide any practical degree of torque multiplication on starting, but if the degree of starting torque multiplication is sufficiently high, the torque supplied by the turbine decreases rapidly as the turbine starts to turn, and vanishes at an impractically low turbine speed. This provides poor acceleration and may furnish little or no torque as the device approaches coupling or one-to-one speed ratio. On the other hand, a turbine can be constructed to provide acceptable coupling characteristics if or when the load reaches approximate impeller speed, but this is done at a sacrifice of starting or stall torque and accelerating torque in the middle ranges of speed.

The foregoing considerations have led to the design and construction of hydrodynamic torque transfer devices, especially torque converters having various arrangements of multiple turbines of varying torque characteristics with or without torque multiplying gearing. Many of those proposed or constructed operate satisfactorily within inherent limitations which it has heretofore been impractical to avoid. Their disadvantages include inadequate maintaining of torque multiplication during intermediate speed ranges, and the difficulty of obtaining adequate torque multiplication in these ranges. These have produced cars which have been sluggish in performance after starting and cars in which it has been impractical to obtain a so-called passing gear, by which is meant the ability to provide a spurt of high acceleration when running at moderate or high speed. Such known devices frequently have been of low efficiency requiring high operating costs.

Our invention seeks to overcome these and other disadvantages of known hydrodynamic transmissions and to provide a transmission which changes torque ratio smoothly and continuously, that is by infinitely small increments without shifting of mechanical torque multiplying devices such as gears. It seeks to improve the efficiency of torque converters and to provide a hydrodynamic torque converter which has a high starting torque ratio, and maintains a higher torque ratio than was formerly had during acceleration to one-to-one drive. The invention also seeks to provide improved and simplified means for increasing the torque ratio at any speed, manually or automatically in response to torque demand on the engine, or both.

Any converter turbine has the inherent characteristic of providing diminishing torque multiplication as the turbine speed increases toward impeller speed, as long as the turbine is operating alone, by which we mean that there is no other turbine ahead of the turbine in question in the liquid stream from the impeller, which other turbine is delivering torque. We combine a series of such turbines, of different torque characteristics, in such a way that as the torque multiplication or torque ratio of one turbine decreases the torque multiplications of downstream turbines increase. By providing a sufficient number of such turbines, while the turbines of the series are successively fading out, that is their torque multiplications are decreasing toward zero, the downstream turbines are increasing their torque ratios so that the torque ratio of the torque converter as a whole decreases toward coupling much more slowly than heretofore, and stays at practically high values over long periods of acceleration of the vehicle. This provides a maneuverable vehicle of high performance, which is very desirable in present day driving conditions.

Preferably, we combine a series of axial flow turbines with a radial inflow turbine and connect each turbine to an output shaft by a mechanical connection having a lower mechanical advantage than that of the connections of the preceding turbine of the series. Preferably also, the connection of the final or radial inflow turbine is direct and the connections of all the other turbines are free-wheeling. In this way during acceleration of the car each turbine runs faster than the next turbine downstream, and as each turbine, except the last, approaches its terminal speed and its torque consequently vanishes that turbine is disconnected from the output shaft, and is free to float or turn idly in the oil stream, neither putting out torque nor taking up any significant amount. For all practical purposes, except for factors such as friction losses each free-wheeling turbine may be considered as removed from the transmission.

We also provide means for increasing the torque ratio of one or more of the turbines at any car speed to provide sudden spurts of higher torque ratio for acceleration in emergencies or for a passing gear. This may be done, for example by changing the angle of the reaction blades if such are used.

The invention also includes improved arrangements of gearing especially helpful in achieving the foregoing objects, as well as an improved timing arrangement which assures smooth application of the friction devices which establish various combinations of the gearing.

Figure 4:
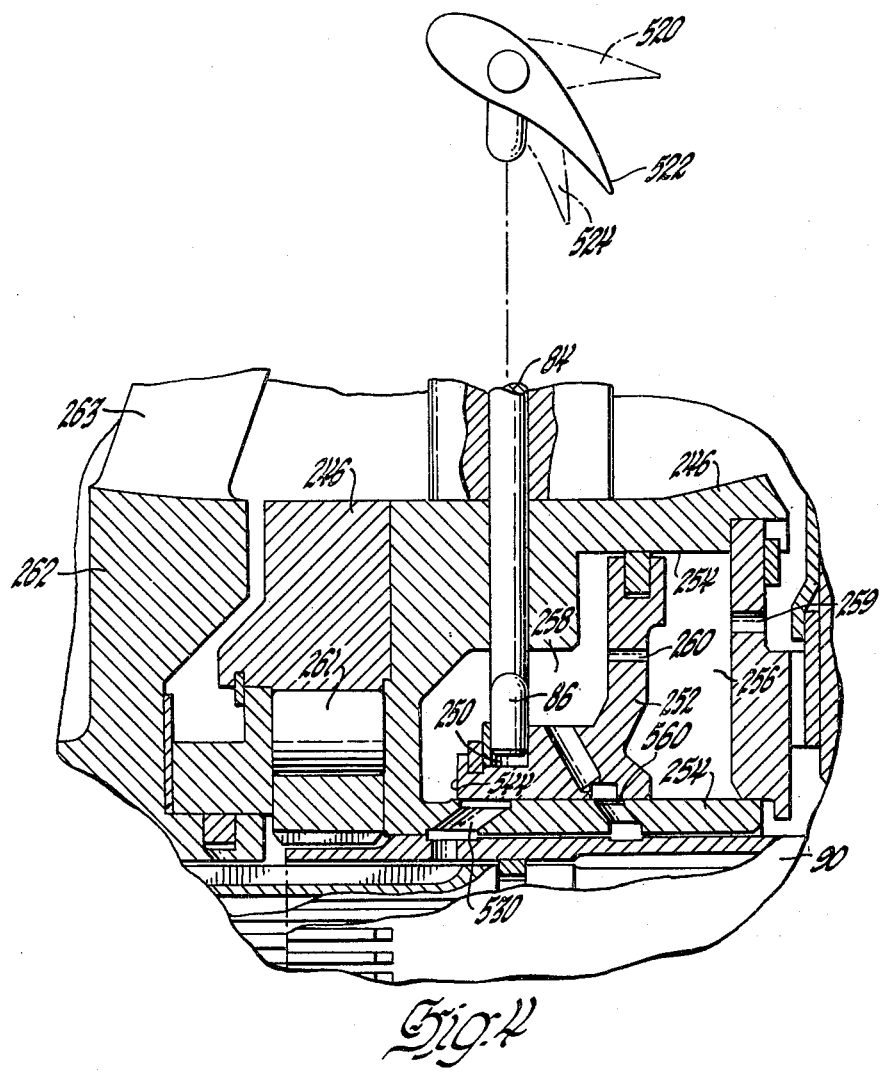

The foregoing and other objects and advantages of the invention will be apparent from the annexed description and from the accompanying drawings, in which:

FIG. 1 is a schematic half of a longitudinal symmetrical section of a transmission embodying one form of the invention, FIG. 2 is a chart showing the pattern of application of various clutches and brakes to effect the desired driving ratios and direction, FIGS. 3 and 3A collectively constitute half of a symmetrical longitudinal section of the actual structure of a transmission embodying one form of the invention and conforming to the schematic diagram shown in FIG. 1, FIG. 4 is an enlargement of a portion of FIG. 3 showing the mechanism for changing the angle of the reaction blades, and FIGS. 5 and 5A collectively form a diagram of one form of control system for the transmission of FIGS. 1 to 4.

Referring to FIG. 1, the transmission includes an input shaft 10 driving a hydrodynamic torque transmitting device, for example a torque converter 12 which drives a planetary forward, reverse and reduction gearing 14 connected to a final output or drive shaft 16. The construction and arrangement of the torque converter itself may be as shown in the application filed by one of us, Oliver K. Kelley, Serial No. 537,472, filed September 29, 1955 the disclosure of which is incorporated herein by reference.

As disclosed in that application the torque converter includes a pump or impeller I of generally known form represented diagrammatically in FIG. 1 by a single blade 20, rotated by the input shaft and circulating working liquid in a closed toroidal path which includes a series of turbines, preferably three. The first turbine $T_1$ represented by a single blade 24, the second turbine $T_2$ represented by a single blade 26, which receives oil from the first turbine $T_1$, and a third turbine $T_3$ represented by a single blade 28, which receives oil from the turbine $T_2$ and returns oil to the pump I, constitute the driving or input elements for the planetary gearing. The torque converter may include a reaction member R represented by the single blade 30.

The first turbine $T_1$ is connected by a shaft 34 to a rear input sun gear 35 of the planetary gearing. The second turbine $T_2$ is connected through hollow shaft 36 to a front input ring gear 37 which can be braked to the frame of the transmission by a reverse brake 38. The turbine $T_3$ is connected through hollow shaft 39 and a neutral clutch 39A to drive the front carrier 40 and the rear carrier 42 of the planetary gearing, which carriers are connected together and respectively support front planetary pinions 44 meshing with the front input ring gear 37, and rear planetary pinions 46 meshing with the rear input sun gear 35. The shaft 39 and the carriers form the principal drive shaft of the transmission and are connected to the transmission output shaft 16. A reaction ring gear 58 meshing with planets 46 completes the rear planetary unit of the reduction gear and a reaction sun gear 60 meshing with the front planet pinions 40 completes the front planetary unit.

The rear reaction gear 58 may be braked against reverse rotation. To this end it is connected to the hub or inner race 62 of an inner one-way clutch or ratchet device having any suitable one-way ratchet members mounted inside of an intermediate hub 66 which forms the outer race. This clutch is symbolically represented by the blade 64 secured to the inner race 62 and overlapping the outer race 66 which indicates that the blade can turn forward toward the eye of the observer and away from the race 66 but cannot turn in the opposite direction. This is a symbolic representation of any suitable one-way clutch. The intermediate hub 66 forms the inner race for an outer one-way clutch or brake represented by the blade 68, fixed to the race 66 and overlapping an outer race 70 which can be held against rotation by a forward drive brake 72. The intermediate race 66 is connected to the front reaction sun gear 60 and may be formed integral with it. The arrangement of the one-way clutches is such that when the forward brake 72 is set the hub and reaction sun gear 60 are prevented from turning backward and the hub 66 in turn prevents the inner race 62 and reaction ring gear 58 from turning backward. In one condition of operation, as will be explained, the ring gear 58 turns forward while the reaction sun gear 60 is held stationary, and under another condition both the ring gear and the sun gear turn forward. Under still another condition of operation, namely reverse drive, the front sun gear 60 is positively driven backward by the ring gear 58 through the one-way clutch 62—64—66, forward brake 72 being released, as will be explained.

As used herein the terms "one-way clutch" and "ratchet device" are synonymous and mean a free wheeler. In the structure described herein the free-wheelers 62—64—66 and 66—68—70 are one-way torque-establishing devices which always function as brakes when the forward brake 72 is set. However, when the forward brake 72 is released, and the reverse brake 38 is set, the ring gear 58 drives the sun gear 60 through the free wheeler 62—64—66, which functions as a one-way clutch and not as a one-way brake.

*Normal forward drive*

For normal forward driving, the forward brake 72 is set, the neutral clutch 39A is engaged and the other brakes are released. On starting, the inertia of the car holds the carriers 40, 42 and the turbine $T_3$ stationary. Oil from the pump I, rotated at suitable speed, exerts torque on $T_1$ to drive the rear input sun gear 35 forward, which, through the rear pinions 46, attempts to drive the rear reaction gear 58 backward, but this is prevented by brake 72 and the two one-way brakes 70—68—66 and 66—64—62. Consequently, ring gear 58 acts as a reaction gear and the carrier 42 and output shaft 16 are driven forward at the reduced speed, thus multiplying the torque supplied by turbine $T_1$. This motion also positively drives the turbine $T_3$ forward regardless of the hydraulic conditions in the torque converter because $T_3$ is positively connected to the output shaft 16. In addition, oil flowing from $T_1$ to $T_2$, which through shaft 36 drives the front input ring gear 37 forward tending to rotate the front pinions 44 forward and when ring gear 37 rotates fast enough, tending to rotate the front reaction sun gear 60 backward. This is prevented by the outer one-way brake 70—68—66, and in fact the front sun gear has previously been locked by the rear reaction ring gear 58 and the two one-way brakes as described. Consequently, the front ring gear 37 adds to the drive the torque of $T_2$ multiplied by the ratio of the front planetary unit.

On starting the car and up to some definite speed, depending upon the design of the blades of the torque converter, the turbine $T_3$ does not exert any positive or forward torque derived from hydraulic action, but as previously stated it is positively driven by the carriers. However, at some definite speed ratio of input shaft to output shaft positive hydraulic torque is impressed on $T_3$ and its speed due to hydraulic action tends to exceed the speed of the carriers as driven by the other turbines. At this point $T_3$ assists in driving the car by torque exerted on the main drive shaft 39—39A—16.

As the speed of the car progressively increases from standstill two things happen successively. First, the torque delivered to the output shaft by $T_1$ through the rear planetary unit drops to a vanishing point as $T_1$ reaches its terminal speed. When this becomes less than the speed of $T_2$ multiplied by the ratio of the front planetary unit, $T_2$ is driving the carriers faster than $T_1$ can drive them and the inner freewheeler 66—64—62 breaks away and the rear reaction gear 58 rotates forward and $T_1$ idles in the oil stream. $T_2$ is now driving the car and may be assisted by $T_3$. Second, upon further increase in the speed of the car $T_2$ reaches its terminal speed and can no longer drive the carriers 40—42 through the front planetary gear as fast as $T_3$ can drive them, $T_3$ being directly connected to the carriers. $T_3$ alone then drives the carriers, the outer freewheeler 70—68—66 breaking away and the sun gear 60 turning forward while $T_2$ idles in the stream of oil.

From the foregoing it is observed that whenever the output shaft 16 tends to rotate forward faster than turbine $T_1$ or turbine $T_2$ can drive it, then $T_1$ or $T_2$ as the case may be, is disconnected from the drive. One of the conditions in which this occurs is when the car over-runs that is the car is moving faster than the turbine $T_1$ or $T_2$ can drive it at the particular engine speed prevailing. We refer to this feature of the structure as one-way torque transmitting connections between $T_1$ or $T_2$ and the output shaft 16. That is, torque or power flow can occur in only one direction so that $T_1$ and $T_2$ can transmit torque to the output shaft, but cannot receive torque from the output shaft. This is true regardless of the sense of rotation of the output shaft, that is, direction of movement of the car.

*Reverse*

For reverse drive the neutral clutch 39A is engaged, as shown by the chart FIG. 2, the forward brake 72 is released, and the reverse brake 38 is set to hold the front ring gear 37 as a reaction gear. Incidentally, this holds $T_2$ stationary during all reverse drive. Now $T_1$ drives the rear input sun gear 35 forward which, because the carrier 42 is initially held stationary by the car, drives the rear ring gear 58 backward and through the inner one-way clutch 66—64—62 drives the front sun gear backward. This is permitted in fact, for although the outer one-way brake 70—68—66 tends to lock, its outer race 70 can turn backward, being unopposed by the released forward brake 72. Consequently, the front sun gear 60, rotating backwards walks the front pinions 44 backward around the stationary ring 37, and the carrier 40 is rotated slowly backward driving the car backward and carrying the turbine blade $T_3$ positively backward. In fact it is possible, depending on blade design, for the turbine $T_3$ to have reverse torque impressed on it hydraulically, in which case it will assist in driving the car backward. The turbine $T_2$ being held stationary in reverse drive can act as a guide wheel or reaction member directing oil from $T_1$ to the forward faces of the $T_3$ blades causing them to drive the carriers backward.

The stator is mounted on any suitable support, to be described, having any known one-way brake represented by the blade 88 and supported on a stationary tube 90 so as to permit forward rotation but prevent backward rotation in the well known manner. In order to provide different values of torque multiplication for different driving conditions we may adjust the angles of the blades 30 of the reaction member, as explained below. For this purpose each reaction blade 30 is fixed to a rotatable shaft 84 having a crank arm 86. Suitable operators, described below, position the cranks to hold the blades at the desired angles.

*Neutral*

In order to place the transmission in neutral all of the clutches and brakes are released as indicated in FIG. 2. Under these conditions $T_1$ can exert no torque on the output shaft 60 because forward brake 72 lets the planetary gears 46 spin the ring gear 58 freely. The turbine $T_2$ can exert no torque on the output shaft 16 because in driving the ring gear 37, the planetary gears 40 spin the reaction sun gear 60 freely backward since this gear is not held by the brake 72. The third turbine $T_3$ can exert no torque because the neutral clutch 39A is not engaged.

*Low ratio or hill braking*

It has been observed that when the car is set for drive the turbines successively pick up the drive and exert torque at progressively decreasing ratios, and that the car eventually becomes driven by the third turbine alone under conditions which are substantially hydraulic coupling providing substantially one-to-one drive. If it is desired to drive the car at a low speed ratio the rear reaction ring gear 58 is positively held by a brake 74 and all other friction couplings are released. For these conditions, the first turbine $T_1$ drives the rear input sun gear 35 which, because ring gear 58 is held, drives the carrier 42 and output shaft 16 forward at a speed which bears a constant ratio to the speed of the turbine $T_1$, this ratio being determined by the rear planetary gear set. The turbine $T_1$ cannot become disengaged from the drive because the reaction ring gear 58 is prevented from freewheeling. Thus, when brake 74 is set $T_1$ is connected to the output shaft 16 by a two-way power transmitting connection. $T_2$ cannot have any effect on the drive because, while it drives the ring gear 37, there is nothing to hold the reaction gear 60, brake 72 having been released. $T_3$ can have no effect on the drive since the neutral clutch 39A is released. Consequently, under these conditions the car remains driven solely by $T_1$ at a definite speed ratio with respect to $T_1$.

This arrangement is also useful in hill braking and tends to retard the car going down grades. The brake 74 is set and all the other clutches and brakes released, as indicated in FIG. 2. $T_2$ and $T_3$ are effectively disconnected from the output shaft 16, as explained above, and the output shaft drives the carrier 42 whenever the car tends to drive the engine. This overdrives the turbine $T_1$, that is it drives the turbine $T_1$ faster than the output shaft by the ratio of the planetary gear set 35—46—58 and at this high speed the turbine $T_1$ tends to become an impeller transmitting torque to the impeller blades 20, thus trying to drive the blades 20 faster than the engine is driving them and opposing the movement of the car.

The transmission may have any suitable parking lock or brake such as a circular flange secured to the carrier 42 or output shaft 16 and having peripheral teeth 76 which can be locked by a dog 78 secured to the frame.

FIGS. 3 and 3A illustrate one form of actual structure embodying the invention including the elements and their mode of operation disclosed schematically above. Referring first to FIG. 3 the engine shaft 10 is bolted to flywheel 200, which is bolted to a torque converter casing including an impeller shell 202 and a front cover 204. The blades 20 are attached to the impeller shell 202 and to an inner shroud 205. The space between the shell and the shroud forms the path through the impeller for working liquid, as is known. In the center of its rear end the impeller shell is welded to a tubular shaft 206 which drives any suitable oil pump 208 herein called the front pump. The shaft 206 is surrounded by any suitable seal 210 which prevents leakage of oil from the torque converter into the dry housing 212 which encloses the torque converter and forming part of the transmission casing 213. The shaft 206 is spaced from the stationary reaction sleeve 90 to form a passage 214 by which working oil may be supplied to the torque converter, as is known, and for operating the stator control as will be explained.

The first turbine $T_1$ includes an outer supporting shell 216 and an inner shroud 218 between which the blades 24 are fixed. The $T_1$ shell 216 is riveted at its center to a flange 220 which may be keyed to or formed integral with the innermost shaft 34 which drives the rear sun gear 35 as shown in FIG. 1. The flange 220 may be provided with any suitable number of openings, not shown, for equalization of pressure between opposite sides of $T_1$ shell 216. The front end of shaft 34 is supported for rotation by a radial and thrust bearing 223 in the front cover 204 which in turn is supported at its center by the cap 228 supported in a bore 230 in the engine shaft 10. The central shaft 34 has a bore 236 in its end to which oil may return from the torque converter under the control of a spring-loaded pressure-responsive relief valve 235 which controls the pressure in the torque converter. Oil from the bore 236 may supply lubricant for the apparatus through passage 239 which is the space between the shaft 34 and the hollow shaft 39 which supports the third turbine $T_3$.

The third turbine $T_3$ has an outer shell 240 and inner shroud 242a between which the blades 28 are fixed. The outer shell is riveted to a flange 244 keyed to shaft 39 which ultimately drives the carriers 40, 42 of both planetary gear units and the transmission output shaft 16. At its rear end the shaft 39 has keyed to it one member of the neutral clutch 39A and its operating mechanism. As shown in FIG. 3A, a drum 237 is keyed to the shaft 39 and supports the piston 238 forming with the drum a pressure responsive operating chamber 240a and urged to the left, as FIG. 3A is seen, by a waved return spring 241. The piston carries a male driving cone clutch member 242a and the drum 237 carries a female driving cone clutch member 243. When pressure is supplied to the chamber 240a, the two cone clutch members 242a and 243 grip between them a conical flange 244a, forming the driven clutch member which is splined to the front planetary carrier 40.

The reaction member, guide wheel, or stator R, which is placed between the outlet of turbine $T_3$ and the inlet of impeller I includes adjustable vanes 30 fixed to the pivots or spindles 84 mounted between a reaction support 246 and an inner shroud 248. As shown best in FIG. 4, each spindle 84 has a crank arm disposed in an annular groove 250 in an annular piston 252 which divides the cylinder 254 in the support 246 into two pressure chambers 256 and 258. Pressure chamber 256 communicates through a passage 259 with the working space within the torque converter and with the previously mentioned oil supply passage 214 between the shaft 206 and the sleeve 90. The pressure chambers 256 and 258 communicate with each other by a restricted passage 260 in the piston 252 and may be supplied with oil under pressure from the control system, to be described, to position the piston 252, which determines the position of the stator blades 30. The reaction support 246 is free-wheeled on the stationary reaction sleeve by an over-running brake including sprags or rollers 261 corresponding to the blade 88 in FIG. 1.

The second turbine $T_2$ is supported on a hub 262 keyed to the hollow shaft 36 and includes a spider having arms 263 supporting an inner shroud 264 which in turn supports an outer shroud 266 between which and an outer shell 268 the blades 26 are supported. The outer shell may be cylindrical and lie closely adjacent the $T_1$ shell 216 and be provided with grooves to restrict leakage between $T_1$ and the outside of $T_2$.

As seen in FIG. 3A the rear end of shaft 36 of the second turbine may be welded to a drum 321 to which is attached the front input ring gear 37 and to which is splined a conical brake drum 322 which can move axially with respect to the drum 321. This brake is for the purpose of holding the ring gear 37 in reverse drive, as explained above, and corresponds to the brake 38 diagrammatically illustrated in FIG. 1. The brake drum 322 may be held fast between a female conical brake member 323 fixed to the stationary casing 213 and a male conical brake member 324 on a piston 326 which may be urged to the right as seen in FIG. 3 against return spring 327 by oil under pressure within a chamber 328, as will be explained in the description of the control system following. The chamber 328 may be formed within a cylinder 329 suitably secured to the housing 213 and carrying pins 330 which engage corresponding openings in the piston 326 to prevent rotation of the piston.

The shaft 34 which connects the first turbine $T_1$ to the rear input sun gear is supported for rotation in a pilot bearing 342 in a bore in the end of the transmission output shaft 16 which in turn is supported by the casing 213 by any suitable radial bearing. The output shaft 16 has formed integrally with its front end a flange 350, the outer edge of which is formed into the teeth 76 for a parking brake, previously referred to. The flange 350 forms part of the rear carrier corresponding to the carrier 42 in FIG. 1. The flange 350 supports one end of spindles 352, the other end of which are supported in a second flange 354 having a collar splined to a hollow shaft 356, the front end of which is formed into an integral flange 355 to which the clutch cone 244a is splined and which supports one end of planetary spindles 366, the other end of which are supported in a flange 370 to constitute the front carrier, corresponding to the carrier 40 in FIG. 1. The spindles 352 support the rear planetary pinions 46 and the spindles 366 support the front planetary pinions 44.

The rear planetary pinion gears 46 mesh with the rear input sun gear 35 and with the rear reaction ring 58. The ring gear 58 is suitably secured to a flange 372 formed integral with the inner race 62 of the inner one-way brake or one-way clutch 62—64—66, previously described, this race being suitably journaled on the collar of the flange 354 by a radial bearing 376. The inner one-way device is completed by the one-way sprags 364 corresponding to the blade 64 in FIG. 1.

The intermediate hub 66 is formed integral with or secured to the front reaction sun gear 60. The intermediate race or drum 66 forms the inner race of the outer one-way brake having sprags 368 corresponding to blade 68 in FIG. 1 and the outer race 70 which latter is splined to a conical brake drum 386 which can be pressed against an outer stationary conical brake surface 388, against the force of a restoring spring 389 by a piston 390 whenever fluid under pressure is admitted to the pressure chamber 391, formed between a flange 392 fixed to the casing 213 and the piston 390 which latter also includes a cylindrical wall 394 having a seal sliding engagement with the flange 392. The arrangement is such that when the piston 390 sets the brake 386—388 it positively holds the outer race 70 of the outer one-way brake, which prevents reverse rotation but allows forward rotation of the intermediate race 66, as well as sun gear 60, which in turn prevents reverse rotation but allows forward rotation of the rear reaction ring gear 58. Thus, the brake 386—388 corresponds to the brake 72 in FIG. 1 which, when engaged, conditions the car for normal forward driving. When this brake is set both the sun gear 60 and the ring gear 58 can rotate forward but neither can rotate backward. Also, as in FIG. 1 when the brake 386—388 is released it permits the ring gear 58 to drive the sun gear 60 backward when the transmission is set for reverse as explained above.

The hill braking or low gear drive-establishing brake is shown in FIG. 3A which corresponds to the diagrammatic brake 74 in FIG. 1. This brake includes an inner drum 396 attached to the rear reaction ring gear 58 and having brake discs 398 splined to it. The brake discs 398 may be engaged with a stationary brake disc 400, splined to the casing 213, by a piston 402 whenever fluid pressure is admitted to a chamber 404 formed between the piston 402, the flange 392 and the collar 394.

The output shaft 16 may have keyed to it any suitable form of pump 408 herein called the rear pump, to supply oil to the control system in response to movement of the vehicle, as will be explained.

*Control system*

The structure, described above, can be operated by any suitable controls which select the desired direction of drive and speed ratios and which place the stator blades in the desired positions, either manually or automatically. One example, of controls embodying our invention is shown collectively and diagrammatically in FIGS. 5 and 5A.

In general this control system includes any suitable source of control fluid under pressure, a manually operable selector valve for selecting forward, neutral, reverse and braking or low; an automatic valve for placing the stator blades in an intermediate position in response to a predetermined torque demand on the engine; and a manual valve for placing the stator in high angle only after the throttle has been fully opened.

The source of pressure includes the front pump 208 (FIG. 3) driven by the engine and the rear pump 408 (FIG. 3A) driven by the output shaft. The pumps take in oil from a sump 410 and delivers it at high pressure through check valves 412 to a main line 414. The pressure in the main line is regulated by any suitable pressure regulator valve generally designated by 418, having an inlet port 420, a pressure regulating chamber 422, a converter feed port 424, a front pump selector port 426, and an exhaust port 428 connected to the sump. These ports are controlled by a valve stem generally designated 430 constantly urged to the left as FIG. 5A is seen by a spring 432. The arrangement is such that when neither pump is providing pressure the spring holds the valve stem to the left, closing converter feed port 424. Upon the building up of pressure to a sufficient value by either pump, the pressure in the regulating chamber 422 moves the stem to the right until port 424 is open to supply oil to the converter at a predetermined pressure through conduit 214 which includes, as shown in FIG. 3, the space between stationary sleeves 90 and 206. Conduit 214 may include a cooler 437 and a pressure-responsive by pass valve 438 (FIG. 5). Whenever the pressure in the main line 414 reaches a predetermined value which indicates that the rear pump is operating at sufficient capacity to supply the controls and lubrication of the entire system the regulator valve 418 opens exhaust port 428 and the front pump is connected directly to the sump through ports 426 and 428 so that thereafter and above this pressure the front pump idles. The pressure is regulated at a maximum value by the land 436, which when the pressure tends to exceed the predetermined maximum, vents the chamber supplied by port 420 through ports 426 and 428.

The main line 414 supplies oil at the regulated pressure to a manual valve 440, FIG. 5A, which selectively directs oil under pressure to the pressure chambers for operating the various clutches and brakes, previously referred to. The manual valve has four supply ports connected to the gallery 442 supplied by main line 414, four exhaust ports each designated 444 and a valve stem 446 having the lands shown. The drawings show the valve stem in the position for forward drive so that oil is supplied to the neutral clutch chamber 240a and to the forward brake chamber 391, all other brake-operating chambers being connected to an exhaust port. If the valve stem 446 is moved one notch to the right into the brake position oil will be supplied from the gallery 442 to the low ratio or hill braking chamber 404 and all other chambers will be vented. On the other hand, if the valve stem is moved one notch to the left from the forward position to neutral all clutch and brake chambers will be vented and the oil supply will be interrupted so that the transmission cannot drive. If the valve stem is moved one notch to the left from neutral, as indicated by the legend reverse, both the neutral clutch 240a and the reverse chamber 328 will be supplied with oil and the other chambers being connected to exhaust.

The control includes automatic means for timing the building up of pressure in the pressure chambers to provide smooth application of the clutch and brakes. To accomplish this the oil flowing from the main line 414 to the manual valve must pass through the timing valve 450 which in one time interval either permits the oil to flow through an unrestricted orifice 452 between an entry port 454 and delivery port 456, and in another time interval requires the oil to flow through a restricted orifice 458. The orifices are in a piston valve 460 urged to unrestricted position by a spring 462. Whenever normal forward drive or reverse drive is established, the manual valve supplies oil to the neutral clutch chamber 240. As soon as the valve is so placed, oil flows quickly through the large orifice 452 until the chambers are filled and the pistons are set against the return springs. This does not actually engage the friction devices operated by the pressure chambers against the return springs, but as soon as the chamber being energized and its connecting lines are filled the pressure between timing valve 450 and the manual valve begins to increase. This moves the piston valve 460 to the left, closing the large hole 452 and restricting the flow of oil by requiring the oil to flow through the small hole 458. This builds up the pressure slowly to its final value for holding the friction device. This gives a smooth application of clutch or brake. While the servo pressure is building up to its final value, the accumulator piston valve 470 is being moved to the right against a spring 472 by pressure in the cylinder 474 which is connected to the neutral clutch by a conduit 476. The increase in volume of the cylinder 472 effected by movement of the piston delays the build up of pressure to its final value in neutral clutch chamber 240 and forward brake chamber 381 or reverse brake chamber 328 as the case may be. By the time pressure has built up to the value of pressure maintained by the regulator valve 418, the accumulator piston valve 470 has opened a conduit 478 leading to a cylinder 480 in the timing valve 450. When this conduit is opened main line pressure is applied to the timing valve where it moves the piston valve 460 to the right, opening large orifice 452 so that the timing valve will be conditioned for the next clutch application, and pressure in the friction elements will be maintained at the desired value regardless of leakage in the system.

The value of the pressure maintained by the regulator valve 418 may be changed as desired for different operating conditions of the transmission. For example, suppose the regulating valve, as so far described, is designed to maintain a selected pressure for holding the hill braking brake 74. A lower pressure than this will suffice to hold the neutral clutch and forward brake. Therefore, whenever the neutral clutch and forward brake are applied the pressure in main line 414 is reduced by a pressure chamber 482 (FIG. 5A) acting on land 483 of the regulator valve, to which chamber main line pressure is admitted by a conduit 486 leading from conduit 476 whenever the neutral clutch is applied. Pressure in chamber 482 reduces the pressure maintained by valve 418 in the known manner.

A higher pressure in the main line may be required for holding the reverse brake 38 than for holding the forward brake 72. Since the chamber 482 reduces pressure whenever the neutral clutch is applied, and since this is applied in reverse, a separate reverse booster chamber 488 is provided at the other end of the regulator valve, which urges plug 490 to the left to assist spring 432 whenever pressure is admitted from line 492 connected to the reverse brake apply cylinder 328. This increases pressure in the well known manner, eliminating the effect of chamber 482 and increasing the pressure to any amount determined by the proportions and areas of the land 483 and plug 490. This is a convenient and improved way of controlling the regulator valve stem 430 to provide various pressure valves for various conditions.

In addition, the line pressure in any setting of the transmission can be regulated in accordance with torque demand on the engine by a pressure control chamber 492 which assists spring 432, as is known, by being connected by conduit 494 to a pressure regulator valve 496 (FIG. 5) which maintains in line 494 a pressure measured by torque demand. Thus, when torque demand is high, line pressure in main line 414 is high, while when torque demand is low, line pressure is reduced.

The pressure regulator valve 496 may be of any suitable known construction. For example, a valve stem 500 either admits oil under main line pressure from main line 414 to a regulated pressure chamber 502 or vents chamber 502 through exhaust port 504. The valve stem is urged up, or toward open position, to increase the pressure by a spring 506, and is urged down, or toward closed and vented position by the force of the regulated pressure, conducted from chamber 502 to a regulating chamber 508. The spring is opposed by a diaphragm 510 exposed on one side to atmospheric pressure and on the other side to the pressure of the intake manifold of the engine of the car, this manifold pressure acting in a closed chamber 512. This is one known form of device for maintaining in the regulated pressure chamber 502 and spaces connected to it, a pressure measured by the torque demand on the engine.

*Control of torque multiplication*

The torque multiplication effected by the torque converter is controlled by positioning the blades 30 of the reaction element as shown in FIG. 4. When the blades are in the position 520, which may be approximately parallel to the axis of rotation of the torque converter as a whole, the blades turn the oil leaving the third turbine $T_3$ through a relatively small angle to redirect the oil into the impeller I. This provides a relatively low degree of torque multiplication, as is known. We refer to it as the low angle position, or low performance position. The blades are held in this position when the piston is fully to the right in cylinder 254, as illustrated in FIG. 5. When the blades 30 are in the position 522 they turn the oil through a larger angle and provide a higher torque ratio, and we refer to this as the intermediate position. The blades are held in the intermediate position when the piston is in the position shown in FIG. 4. When the blades 30 are in the position 524 they turn the oil through the largest angle and provide the highest torque multiplication. We call this the high angle or high performance position. The piston holds them so when fully to the left in the cylinder, as shown in FIG. 3.

The blades are constantly urged toward low angle by oil flowing from $T_3$ to I. This strikes the concave faces of blades 30 which have more area on the right side of the pivots 84 than on the left side so that the reaction force of the circulating oil always urges the blades toward the lowest angle position. The blades are urged toward high angle against the hydraulic force on the blades by the pressure of oil in high-angle control chamber 256, which urges piston 252 to the left as FIG. 4 is viewed, to rotate the shafts 84 counterclockwise as seen from the bottom of FIG. 4. The whole apparatus is designed so that the pressure existing in chamber 256 can always overcome the hydraulic force on blades 30 which urges them toward low angle. Therefore, under all conditions of operation, the pressure in chamber 256, if this chamber is in control, will put the blades in high angle. Oil can always enter high angle control chamber from the converter space through passages diagrammatically represented by the orifice 259.

It is desirable to have the blades 30 normally in low angle. They are normally held in this position by balancing the pressure of oil in the high angle chamber 256 by oil held at converter pressure in low angle chamber 258, so that the hydraulic force on the blades holds them at low angle. Oil may be admitted to the low angle chamber 258 in any suitable way under suitable controls, one convenient way being to admit oil slowly and constantly to the chamber 258 from the high angle chamber 256 through the restricted orifice 260 in the piston 252. As long as oil is maintained at the same pressure in both chambers 256 and 258, the hydraulic force on the blades 30 will hold them in low angle.

We prefer to put the blades in mid position to provide a moderate increase in torque multiplication automatically in response to torque demand on the engine, for example when the car encounters an up-grade. We do this by venting some of the oil from low angle chamber 258 faster than it can flow in through orifice 260, to allow high angle chamber 256 to move the piston 252, then arresting the piston in mid position and thereafter regulating the pressure in low angle chamber 258 so that its force, plus the hydraulic force on the blades, exactly balances the force of converter pressure in high angle chamber 256. This may be accomplished as follows:

An exhaust port 530 in the low angle control chamber 258 can be connected to the sump through conduit 532 leading to the torque demand relay valve 534, which either closes the conduit to hold oil in the low control chamber 258 or connects the conduit to an exhaust port 536 to drain oil from the chamber. The torque demand valve is urged to closed position by a spring 538 and may be opened against the force of the spring by pressure in a cylinder 540 to which oil at a pressure measured by torque demand on the engine is admitted by conduit 542 from chamber 502 of the torque demand regulator valve 496. Whenever the torque demand is above a predetermined amount, for example as represented by a vacuum of 6 to 8 inches of mercury in the engine intake manifold, the pressure in chamber 540 is high enough to open the valve 534 to drain oil from the low angle chamber 258.

As oil flows from this chamber 258, the piston moves to the left as FIG. 4 is seen until the edge 544 covers vacuum exhaust port 530, which occurs when the blades 30 reach intermediate position. Oil is now trapped in and constantly supplied through orifice 260 to low angle chamber 258, preventing further movement of the piston. Thereafter, the piston constitutes a self-lapping regulator valve which maintains in low angle chamber 258 a pressure which, with the hydraulic force on the blades, just balances the pressure in high angle chamber 256 to hold the blades in mid position as long as the torque demand valve 534 is open. Oil normally leaks out of the chamber 258 so that the piston tends to move the blades toward a higher angle but such movement immediately tends to close the port 530 by the piston which results in tending to equalize pressure in chambers 256 and 258 which lets the hydraulic force on the blades tend to restore them to low angle. As soon as the blades come back exactly to intermediate position or move slightly beyond it toward low angle, the edge 544 of the piston again opens port 530 slightly, which tends to reduce pressure in low angle chamber 258 to hold the blades in mid position. Thus, the piston does one of two things. Either it tends to move constantly and cyclically between a position in which port 530 is just closed and another position in which port 530 is slightly open, or it maintains a steady position with the port 530 slightly open. Whichever it does depends on relative rates of supply to the low control cylinder 258 and leakage from it. In either event the piston maintains the blades in mid position as long as valve 534 is open as indicated by high torque demand. If the torque demand falls, valve 534 closes, the pressure in chambers 256 and 258 equalizes and hydraulic force on the blades forces them to low angle.

To place the blades in the highest angle in response to very high torque demand, for example to pass another car, the low angle chamber 258 is completely vented, allowing the high angle chamber 256 to move the piston 252 fully to the left, as shown in FIG. 3. This is accomplished as follows:

The driver of the vehicle pushes the usual throttle pedal (not shown) to the floor, past wide open throttle position. This does two things: First, it immediately increases intake manifold pressure (reduces the vacuum) so that torque demand valve 534 opens, putting the blades in mid position. Second, it simultaneously opens a kickdown valve 550, by linkage not shown, and this connects an exhaust port 552 to conduit 554 which is connected to kick-down vent port 556 in the wall of cylinder 254. When the piston 252 is in low angle position this port may be closed by the piston, but when the piston reaches mid position it uncovers the port 556 and vents low angle chamber 258 through a duct 558 in the piston even after the piston edge 554 has closed port 530. This permits the piston to travel fully to the left, as seen in FIG. 3 to place the blades in high angle. If desired the port 556 can be so placed that it is closed by the edge 560 of the piston just as the blades reach high angle position. This will cause the piston to regulate the pressure in low angle chamber 258 to hold the blades in low angle, and has the advantage of reducing leakage through the high angle chamber which might otherwise reduce its pressure.

Within the limits of maintaining adequate pressure in the control chambers 256 and/or 258 to hold the blades in the desired angle, there is advantage in maintaining a high leakage from the low angle chamber 258 through the appropriate vent port. Such leakage increases the flow through the cooler 437 at the time when need for cooling increases, namely when the angle of the blades is increased.

The blades 30 will remain in high angle as long as the kickdown valve 550 is held open, but when the throttle is returned to the normal operating range of positions, the kick-down valve is returned to the position shown in FIG. 5 by a spring 570, closing conduit 554 to hold oil in low angle chamber to restore the blades either to mid-position or to low angle, as determined by the position of the torque demand valve 534.

In normal driving practice, the blades will be in low angle position 520 whenever engine manifold vacuum is above 6 to 8 inches of mercury, indicating low torque demand, and will be in mid position 522 whenever the engine manifold vacuum is below 6 to 8 inches, indicating increased torque demand. Whenever there is exceptionally high torque demand the blades will be placed in high angle position 524 by flooring the throttle pedal.

It will be observed that in normal forward drive, the neutral clutch is energized, therefore, the chamber 482 of the main regulator valve 488 will be active and this may maintain a pressure in main line 414 between 50 and 130 lbs., for example depending on the torque demand as indicated by the vacuum regulator valve 458 and as signalled to chamber 492 of the main regulator valve. In reverse the neutral clutch is also energized and the chamber 482 will be active, but the reverse brake chamber 328 is also energized and this will apply pressure to the reverse booster chamber 488 which overcomes the force exerted by chamber 492, and, therefore, raises main line pressure. This may now be between 60 and 160 pounds, depending on throttle opening. In the hill braking position the manual valve energizes only the braking chamber 404. This empties both chambers 438 and 488 of the main regulator valve, and lets chamber 492 and the spring 432 maintain a line pressure between 90 and 240 pounds per square inch.

We claim:

1. A transmission comprising in combination a first planetary gearset including an input gear, a reaction gear and planetary gears mounted on a carrier, the carrier being adapted to be connected to an output shaft; a second planetary gearset including an input gear, a reaction gear and planetary gears mounted on a carrier connected to the first carrier; means for rotating the first input gear forward; means independent of the first gearset for rotating the second input gear forward; a one-way torque-establishing device for preventing reverse rotation of one of the reaction gears, a second one-way torque-establishing device between the reaction gears for preventing reverse rotation of the other reaction gear and means for holding said other reaction gear against rotation in both directions.

2. A transmission comprising in combination a first planetary gearset including a sun gear, a ring gear and planetary gears mounted on a carrier, the carrier being adapted to be connected to an output shaft; a second planetary gearset including a ring gear, a sun gear and planetary gears mounted on a carrier connected to the first carrier; means for rotating the first sun gear forward; means independent of the first gearset for rotating the second ring gear forward; a one-way torque-establishing device for preventing reverse rotation of the second sun gear; a second one-way torque-establishing device between the second sun gear and the first ring gear for preventing reverse rotation of the first ring gear, and means for preventing rotation of the first ring gear in either direction.

3. A transmission comprising in combination a first planetary gearset including an input gear, a reaction gear and planetary gears mounted on a carrier, the carrier being adapted to be connected to a load shaft; a second planetary gearset including an input gear, a reaction gear and planetary gears mounted on a carrier connected to the first carrier; means for rotating the second input gear forward; a first one-way torque-establishing device connected to the second reaction gear; a brake which when engaged holds the one-way torque-establishing device to prevent reverse rotation of the second reaction gear; a fluid pressure brake actuator which when filled with fluid under pressure engages the brake and when empty releases the brake; a second one-way torque-establishing device between the reaction gears for preventing reverse rotation of the first reaction gear when said brake holds the first one-way torque-establishing device; a second brake which when engaged prevents rotation of the second reaction gear in either direction; a second fluid pressure brake actuator which when filled with fluid under pressure engages the second brake and when empty releases the second brake; a source of fluid pressure; and means for selectively filling the first brake actuator while emptying the second brake actuator or filling the second brake actuator while emptying the first brake actuator.

4. A transmission comprising in combination a hydrodynamic torque transmitting device which includes an impeller and a plurality of turbines, first and second planetary gearsets each including an input gear, a reaction gear and planetary gears journaled on a carrier and meshing with the input and reaction gears; a first turbine of said device receiving liquid from the impeller and driving the input gear of one planetary gear set, a second turbine of said device receiving liquid from the first turbine and driving the input gear of the other planetary gearset; a third turbine of said device receiving liquid from the second turbine, means for selectively connecting to or disconnecting the third turbine from the carrier; means for preventing reverse rotation while permitting forward rotation of both reaction gears; and an output shaft driven by the carriers.

5. A transmission comprising in combination a hydrodynamic torque transmitting device which includes an impeller and a plurality of turbines, first and second planetary gearsets each including an input gear, a reaction gear and planetary gears journaled on a carrier and meshing with the input and reaction gears; a first turbine of said device receiving liquid from the impeller and driving the input gear of one planetary gear set, a second turbine of said device receiving liquid from the first turbine and driving the input gear of the other planetary gearset; a third turbine of said device receiving liquid from the second turbine, means for selectively connecting to or disconnecting the third turbine from the carriers, means for preventing reverse rotation while permitting forward rotation of both reaction gears; an output shaft driven by the carriers and means for preventing rotation in either direction of the reaction gear of the first gearset.

6. A transmission comprising in combination a hydrodynamic torque transmitting device which includes an impeller and a plurality of turbines, first and second planetary gearsets each including an input gear, a reaction gear and planetary gears journaled on a carrier and meshing with the input and reaction gears; an output shaft connected to both carriers; a first turbine of said device receiving liquid from the impeller and driving the input gear of the first planetary gear set, a second turbine of said device receiving liquid from the first turbine and driving the input gear of the second planetary gearset; a third turbine of said device receiving liquid from the second turbine, a clutch for selectively connecting to or disconnecting the third turbine from the carriers, a fluid pressure clutch actuator which when filled engages the clutch to connect the third turbine to the carriers and when empty releases the clutch to disconnect the third turbine from the carriers, a one-way torque-establishing device connected to the second reaction gear; a brake which when engaged holds the one-way torque-establishing device to prevent reverse rotation of the second reaction gear; a fluid pressure brake actuator which when filled with fluid under pressure engages the brake and when empty releases the brake; a second one-way torque-establishing device between the reaction gears for preventing reverse rotation of the first reaction gear when said brake holds the first one-way torque-establishing device; a second brake which when engaged prevents rotation of the second reaction gear in either direction; a second fluid pressure brake actuator which when filled with fluid under pressure engages the second brake and when empty releases the second brake; a source of fluid pressure; and means for selectively filling the clutch actuator and the first brake actuator while emptying the second brake actuator or filling the second brake actuator while emptying the first brake actuator and the clutch actuator.

7. A transmission comprising in combination a hydrodynamic torque transmitting device which includes an impeller, a first turbine receiving liquid from the impeller and a second turbine receiving liquid from the first turbine; a first planetary gear set including an input gear connected to the first turbine, reaction gear and planetary gears mounted on a carrier which is adapted to be connected to an output shaft; a second planetary gear set including an input gear connected to the second turbine, a reaction gear and planetary gears mounted on a carrier connected to the first carrier; a one-way torque-establishing device for preventing reverse rotation of the second reaction gear, a second one-way torque-establishing device between the reaction gears for preventing reverse rotation of the first reaction gear and means for holding the second reaction gear against rotation in both directions.

8. A transmission comprising in combination a hydrodynamic torque transmitting device which includes an impeller, a first turbine receiving liquid from the impeller, a second turbine receiving liquid from the first turbine and a third turbine receiving liquid from the second; a first planetary gear set including an input gear connected to the first turbine, a reaction gear and planetary gears mounted on a carrier, which is adapted to be connected to an output shaft and to the third turbine; a second planetary gear set including an input gear connected to the second turbine, a reaction gear and planetary gears mounted on a carrier connected to the first carrier; a one-way torque-establishing device for preventing reverse rotation of the second reaction gear; a second one-way torque-establishing device between the reaction gears for preventing reverse rotation of the first reaction gear; means for holding the second reaction gear against rotation in both directions; and means for selectively connecting the third turbine to the carriers and disconnecting it from the carriers.

9. A transmission comprising in combination a hydrodynamic torque transmitting device which includes an impeller, a first turbine receiving liquid from the impeller, a second turbine receiving liquid from the first turbine and a third turbine receiving liquid from the second; a first planetary gear set including a sun gear connected to the first turbine, a ring gear and planetary gears mounted on a carrier which is adapted to be connected to an output shaft and to the third turbine; a second planetary gear set including a ring gear connected to the second turbine, a sun gear and planetary gears mounted on a carrier connected to the first carrier; a one-way torque-establishing device for preventing reverse rotation of the second reaction gear; a second one-way torque-establishing device between the first ring gear and second sun gear for preventing reverse rotation of the first ring gear; means for holding the second ring gear against rotation in both directions; and means for selectively connecting the third turbine to the carriers and disconnecting it from the carriers.

10. A transmission comprising in combination a hydrodynamic torque transmitting device which includes an impeller, a first turbine receiving liquid from the impeller, a second turbine receiving liquid from the first turbine; a first planetary gear set including an input gear connected to the first turbine, a reaction gear and planetary gears mounted on a carrier which is adapted to be connected to an output shaft; a second planetary gear set including an input gear connected to the second turbine, a reaction gear and planetary gears mounted on a carrier connected to the first carrier; a one-way torque-establishing device connected to the second reaction gear; a brake which when engaged holds the one-way torque-establishing device to prevent reverse rotation of the second reaction gear; an actuator for the brake; a second one-way torque-establishing device between the reaction gears for preventing reverse rotation of the first reaction gear when said brake holds the first one-way torque-establishing device; a second brake which when engaged prevents rotation of the second reaction gear in either direction; a second brake actuator for the second brake; and means for selectively operating each brake actuator alone.

11. A transmission comprising in combination a hydrodynamic torque transmitting device which includes an impeller, a first turbine receiving liquid from the impeller, a second turbine receiving liquid from the first turbine and a third turbine receiving liquid from the second turbine; a first planetary gear set including an input gear connected to the first turbine, a reaction gear and planetary gears mounted on a carrier which is adapted to be connected to an output shaft and to the third turbine; a clutch for connecting the third turbine to the carrier; a clutch actuator for engaging the clutch; a second planetary gear set including an input gear connected to the second turbine, a reaction gear and planetary gears mounted on a carrier connected to the first carrier; a one-way torque-establishing device connected to the second reaction gear; a brake which when engaged holds the one-way torque-establishing device to prevent reverse rotation of the second reaction gear; a first brake actuator for said brake; a second one-way torque-establishing device between the reaction gears for preventing reverse rotation of the first reaction gear when said brake holds the first one-way torque-establishing device; a second brake which when engaged prevents rotation of the second reaction gear in either direction; a second brake actuator for the second brake and means for selectively operating the first brake actuator and the clutch actuator without operating the second brake actuator or operating the second brake actuator without operating the first brake actuator or the clutch actuator.

References Cited in the file of this patent

UNITED STATES PATENTS

| | | |
|---|---|---|
| 2,316,390 | Biermann | Apr. 13, 1943 |
| 2,464,538 | Vanderzee | Mar. 15, 1949 |
| 2,645,137 | Roche | July 14, 1953 |
| 2,739,494 | Russell | Mar. 27, 1956 |
| 2,795,154 | Russell | June 11, 1957 |

UNITED STATES PATENT OFFICE
CERTIFICATE OF CORRECTION

Patent No. 3,008,382                 November 14, 1961

Edward H. Hawley et al.

It is hereby certified that error appears in the above numbered patent requiring correction and that the said Letters Patent should read as corrected below.

Column 16, lines 73 to 75, for "to hold it therebetween without precluding rotation of the axially so that its opposite end is engaged in said index-its advanced position to effect movement of the tap blank" read -- its advanced position to effect movement of the tap blank axially so that its opposite end is engaged in said indexing chuck member and to exert a force upon the tap blank --; column 17, line 1, for "ing chuck member and to exert a force upon the tap blank" read -- to hold it therebetween without precluding rotation of the --; same column 17, line 52, after "indexing" strike out the comma.

Signed and sealed this 25th day of June 1963.

(SEAL)
Attest:

ERNEST W. SWIDER
Attesting Officer

DAVID L. LADD
Commissioner of Patents